United States Patent [19]

Zimmel et al.

[11] Patent Number: 5,071,914

[45] Date of Patent: Dec. 10, 1991

[54] THERMOPLASTIC HOT MELT ADHESIVE CONTAINING EPOXY ADDUCT

[75] Inventors: John M. Zimmel, St. Paul; Pamela M. Klinkenberg, Roseville; William L. Bunnelle, Stillwater; Keith C. Knutson, Columbia Heights, all of Minn.

[73] Assignee: H. B. Fuller Company, St. Paul, Minn.

[21] Appl. No.: 395,182

[22] Filed: Aug. 17, 1989

Related U.S. Application Data

[60] Continuation of Ser. No. 209.171, Jun. 15, 1988, abandoned, which is a continuation of Ser. No. 934,241, Nov. 20, 1986, abandoned, which is a division of Ser. No. 823,607, Jan. 29, 1986, abandoned.

[51] Int. Cl.$^5$ .................. C08L 31/04; C08L 39/04; C08L 63/02
[52] U.S. Cl. .................. 525/113; 525/92; 525/109; 525/111.5; 525/117; 525/119; 525/120; 525/122
[58] Field of Search .............. 525/533, 530, 532, 109, 525/111.5, 113, 117, 119, 120, 122, 92

[56] References Cited

U.S. PATENT DOCUMENTS

| | | | |
|---|---|---|---|
| 2,750,304 | 6/1956 | Hendricks et al. | 117/76 |
| 2,898,315 | 8/1959 | Smith et al. | 260/27 |
| 2,986,539 | 5/1961 | Schniepp et al. | 260/18 |
| 3,100,160 | 8/1963 | Korpman | 117/122 |
| 3,136,681 | 6/1964 | Johnston | 161/190 |
| 3,211,602 | 10/1965 | Horstman | 156/330 |
| 3,223,655 | 12/1965 | Murdock | 260/4 |
| 3,312,754 | 4/1967 | Marks et al. | 260/837 |
| 3,313,861 | 4/1967 | Szawlowski et al. | 260/830 |
| 3,331,886 | 7/1967 | Zimmerman et al. | 525/108 |
| 3,334,057 | 8/1967 | Marks et al. | 260/23 |
| 3,465,058 | 9/1969 | McCarthy | 260/837 |
| 3,636,500 | 2/1972 | Mung et al. | 260/837 |
| 3,655,595 | 4/1972 | Higashi | 260/18 |
| 3,760,031 | 9/1973 | Sato et al. | 260/836 |
| 3,966,836 | 6/1976 | de Cleur et al. | 260/835 |
| 3,969,300 | 7/1976 | Nagata et al. | 260/29.4 |
| 4,042,478 | 8/1977 | Hazan et al. | 204/181 |
| 4,092,374 | 5/1978 | Douek et al. | 525/101 |
| 4,100,045 | 7/1978 | Bogan et al. | 204/159.16 |
| 4,126,596 | 11/1978 | Schimmel et al. | 260/29.6 |
| 4,133,796 | 1/1979 | Bullman | 260/37 |
| 4,212,921 | 7/1980 | Wolinkski et al. | 428/414 |
| 4,225,480 | 9/1980 | Schimmel et al. | 260/29.6 |
| 4,352,842 | 10/1982 | Kooymans et al. | 427/385.5 |
| 4,447,579 | 5/1984 | Takagi et al. | 525/113 |
| 4,476,259 | 10/1984 | Kordomenos | 523/400 |
| 4,517,340 | 5/1985 | Read et al. | 525/113 |
| 4,522,967 | 6/1985 | Sheldon et al. | 524/377 |
| 4,528,329 | 7/1985 | Inoue et al. | 525/74 |
| 4,623,688 | 10/1986 | Flanagan | 524/377 |
| 4,871,803 | 10/1989 | Zimmel et al. | 525/113 |

FOREIGN PATENT DOCUMENTS 115307 8/1984 European Pat. Off. .

OTHER PUBLICATIONS

Petrolite Specialty Polymers Group Technical Bulletin, Unilin ® Alcohols, 1985, Tulsa, Oklahoma.
Dow Chemical Company Technical Bulletin, PRIMACOR Adhesive Polymers, Midland, Michigan.
A Shell Chemical Company Technical Bulletin regarding EPON Resins, EPONOL Resins, Bisphenol-A, and Intermediates/Diluent.
A Shell Chemical Company Technical Bulletin regarding CARDURA ®.
Finaprene Technical Bulletin, Solution Polymerized Butadiene-Styrene Block Copolymers.
Sylvachem Corporation Product Data Sheet, SYLVATAC ® 105NS, Panama City, Florida.
Exxon Chemical Americas Technical Bulletin, ESCOREZ ® 2393, Sep. 1984, Houston, Texas.
Hercules Incorporated Technical Bulletin, Introducing PERMALYN ® 105N, Wilmington, Delaware.
duPont Technical Bulletin, ELVAX ® Grade Selector Chart.
Chemistry . . . Composition of Arizona Products, pp. 6-7.
EVA Acid Terpolymers in Hot Melt Adhesives, K. C. Brinker, Adhesives Age, Aug. 1979, duPont de Nemours, Wilmington, Delaware.
Shell Technical Bulletin, Specification Guide for EPON ® Resins.
Shell Chemical Company Techynical Bulletin, Bisphenol A, SC:493-80R.
Ciba-Geigy Technical Bulletin regarding ARALDITE ® RD-2.
CasChem Technical Bulletin, Baker, Bayonne, New Jersey.
International Minerals & Chemical Corporation Technical Data Sheet, DMPA.
Elvax Resin Publication (5 pages).

Primary Examiner—Melvyn I. Marquis
Assistant Examiner—Robert E. L. Sellers, II
Attorney, Agent, or Firm—Merchant, Gould, Smith, Edell, Welter & Schmidt

[57] ABSTRACT

The adhesive properties of a hot melt adhesive, comprising a base polymer and a tackifying resin, can be improved by introducing into the hot melt adhesive an epoxy adduct comprising the reaction product between a compound such as a polymer having at least one active hydrogen and an epoxy compound.

10 Claims, No Drawings

THERMOPLASTIC HOT MELT ADHESIVE CONTAINING EPOXY ADDUCT

This is a continuation of application Ser. No. 209,171, filed June 15, 1988, now abandoned, which is a continuation of Ser. No. 934,241, filed Nov. 20, 1986, now abandoned, which is a division of Ser. No. 823,607, filed Jan. 29, 1986, now abandoned.

FIELD OF THE INVENTION

The invention relates to a hot melt adhesive composition and to a novel additive for hot melt adhesive compositions which can be blended into an adhesive to increase or improve its adherent or other properties. Typically a hot melt adhesive comprises a blend of a thermoplastic base polymer and other adhesive additive compositions such as tackifiers, extending oils, waxes, inorganic compositions, and other components. These components cooperate to provide desirable properties to the adhesive composition as a whole.

More particularly, the invention relates to a novel epoxy adduct composition which can be used in conjunction with conventional adhesive thermoplastic polymers and additives in the formulation of new hot melt adhesives with novel levels or combinations of adherent or other properties.

BACKGROUND OF THE INVENTION

Hot melt adhesives are adhesives which are applied molten, at elevated temperatures in the substantial absence of a solvent. The hot melt can be applied in a glue line and can form a strong, adherent bond when cooled. Hot melt adhesives are typically made by combining a thermoplastic base polymer with a variety of other additive components to produce desirable properties in the finished adhesive composition. A great deal of attention has been directed for many years to the development and the formulation of hot melt adhesives in view of the economy, safety, ease of use, and applicability of hot melt adhesive technology.

Hot melt adhesives can be made from a variety of thermoplastic base polymers including ethylene-vinyl acetate polymers, atactic polypropylene polymers, acrylic polymers, vinyl pyrrolidone polymers, polyalkylene-oxazoline polymers, natural and synthetic rubbers such as KRATON, KRATON G and others, etc. Such hot melt adhesives can be pressure sensitive, and can be used on a variety of natural and synthetic substrates. The adhesives can be either insoluble in water or partially or fully soluble in water, and can be water actuated.

The successful formulation of a variety of hot melt adhesives with various properties requires a number of multi-functional adhesive components. Many adhesive components currently available for use in adhesive formulation can be used in combination to provide an adhesive of high quality. Certain adhesive applications have no fully successful adhesive. Fluorocarbon bonded materials, for example, are well known for resistance to formation of strong bonds with current adhesives. New materials in packaging are constantly being developed which require adhesives that are useable with the new materials.

A constant search is underway for new adhesive additive compositions for use in adhesive formulations that can impart novel properties to adhesives, can increase the compatibility of adhesive components, can adhere to fluorocarbons and other new materials and can reduce the cost of current adhesive formulations. Accordingly a continuing need exists for improved hot melt adhesive additive components.

BRIEF DESCRIPTION OF THE DRAWINGS

We have found a novel hot melt adhesive additive composition which can be made compatible in common hot melt adhesive formulations and which can provide substantially improved adherent and other properties in a number of applications.

Briefly, the adhesive additive composition of this invention comprises an epoxy adduct comprising the reaction product of (1) a compound with at least one pendent epoxy reactive-active hydrogen, and (2) an epoxy compound having preferably two or more free reactive epoxy or oxirane rings. Either the reactive hydrogen containing compound or the epoxy compound can be polyfunctional to obtain a compatible composition that can augment adhesive properties in hot melt compositions.

Preferably the adhesive additive composition of the invention comprises a polymeric adduct comprising the reaction product of (1) a polymer with at least one epoxy reactive hydrogen, and (2) an epoxy compound preferably with two or more epoxy groups. Alternatively the preferred adhesive adduct can contain additionally a monomeric epoxy reactive compound which can contain one or more hydroxy groups such as an alkanol amine, or the adduct can contain a functional compound such as a dimer acid, a diphenolic compound, a diamine or other compound.

For the purposes of this invention the term polyfunctional means that the compound contains two or more of the named functional group. For example, a polyfunctional epoxy compound has two or more reactive epoxy or oxirane groups in the molecule. Further, the term compatible or compatibility means that a composition containing two or more components that differ, will not readily separate into phases when held in a melt condition for an extended period.

A first aspect of the invention is the novel hot melt adhesive additive composition comprising the epoxy adduct.

A second aspect of the invention is an epoxy-polymeric adduct which is a reaction product of a polymer, and an epoxy compound.

A third aspect of the invention is the adduct of this invention further reacted with a monomeric compound with an epoxy reactive hydrogen, or a difunctional compound.

A fourth aspect of the invention is a hot melt adhesive composition comprising a base thermoplastic polymer, the novel epoxy adduct additive composition of the invention, a tackifying resin, and optionally other adhesive additives.

While we do not wish to be held to a theory of action of the invention, we believe that the polyfunctional epoxy adduct can be made with varying proportions of components. The reaction product molecular weight, hydrophilicity, solubility and size is controlled by the proportions of the components and their functionality. In this way polymeric additives with acceptable molecular weight, hot melt compatibility and acceptable viscosity in the hot melt can be made.

DETAILED DESCRIPTION OF THE INVENTION

The novel adhesive additive composition of the invention comprises the polymeric reaction product of (1) a compound having at least one pendent, epoxy reactive group, and (2) a polyfunctional epoxy compound with at least two reactive epoxy or oxirane rings. Preferably, the above reaction product can contain a dimer compound or a compound having at least one epoxy reactive hydrogen, which can have hydroxy functionality, or mixtures thereof.

Compounds that can be reacted with the epoxy compound in forming the epoxy adduct of this invention include compositions having a free hydrogen that is reactive with an epoxy group. Typically reactive hydrogens are found in carboxylic acid groups, aromatic hydroxyl groups, amino groups, and sulfhydryl groups. Typically compounds having one of these functional groups can be used in forming the epoxy adducts of the invention.

Typical examples of carboxylic acid compounds that can be used in making the adduct of the invention include mono, di and tricarboxylic acids. Typically the carboxylic acid compounds have a molecular weight of at least 100 to provide some hydrophobic functionality. Carboxylic acids that can be used in the invention include benzoic acid, maleic acid, maleic anhydride, fumaric acid, and others. Preferred carboxylic acids for use in the invention comprise $C_6$ and higher carboxylic acid including unsaturated and polyunsaturated carboxylic acid and their dimer product. Most preferred carboxylic acid compounds comprise dimer and trimer acids formed by reacting unsaturated groups in the carbon chain of di and triunsaturated $C_{6-24}$ carboxylic acids.

Polymers useful in preparing the novel adhesive additive composition of the invention can be any polymer having a pendent active hydrogen containing group. Such pendent groups include a carboxyl group, an amine group, an aromatic hydroxyl, a mercapto group, and others. Useful polymers include vinyl polymers, polyesters, polyamides, polycarbonate, carboxylated polymers, etc. The polymer chain must contain at least one active hydogen containing group as a result of (1) the inclusion of at least one monomer, in the polymerization reaction mass, that has a free active hydrogen or (2) the formation of an active hydrogen after polymerization by oxidation, sulfurization, carboxylation, or other post polymerization reaction.

Monomers that can be used in the formation of polymers having pendent groups having active hydrogens include monomers with pendent carboxyl, amine, or aromatic hydroxyl groups. Vinyl monomers containing pendent amino groups include acrylamide, methacrylamide, maleimid, aminoethylacrylate, aminoethylmethacrylate, n-vinyl heterocyclic monomers, and others. Aromatic hydroxyl containing vinyl monomers include hydroxy styrene, 5-hydroxy-1-vinyl naphthalene, hydroxy phenyl methacrylate, and others.

Preferred polymers for use in the invention can comprise carboxylated vinyl polymers or vinyl polymers having randomly polymerized vinyl monomers with one or more free reactive carboxyl groups. Such carboxyl containing vinyl monomers must contain at least one polymerizable ethylenically unsaturated group and at least one carboxylic acid group which remains free and reactive after polymerization. Specific examples of polymerizable ethylenically unsaturated carboxylic acid monomer compounds include acrylic acid, methacrylic acid, itaconic acid, fumaric acid, maleic acid, maleic anhydride (post-polymerization hydrolysis required), crotonic acid, 4-vinyl benzoic acid, and other aliphatic, aromatic, cyclic, and bicyclic carboxylic acid containing monomers, etc. Preferred vinyl monomers comprise acrylic acid and methacrylic acid for reasons of economy, availability, ease of polymerization and reactivity of the resulting carboxyl-containing polymer.

Alternatively, a polymer can be carboxylated during or after polymerization to form pendent carboxyl groups. For example, polyester polymers can be formed from a mixture of di- and trifunctional carboxylic acid compounds and polyfunctional alcohols resulting in the formation of a polymer with pendent reactive carboxyl, also known as carboxylic acid, groups. Similarly, polyamide polymers can be made with a mixture of di- and trifunctional acids resulting in pendent carboxyl groups. Such polymers are well known and the preparation of such polymers are well within the skill of the art. Further, polymers and copolymers made of many monomers can be oxidized or reacted with a carboxylating agent in known techniques to form known polymers with free carboxyl groups.

The vinyl polymer can be made up of other ethylenically unsaturated monomers to insure compatibility between the adhesive additive composition and the base thermoplastic polymer of the hot melt adhesive composition. In the instance that a polyethyloxazoline base polymer is used we have found that an acrylic acid containing vinyl polymer can be used. In the instance that a KRATON G (styrene-ethylene butylene-styrene) copolymer be used, preferred monomers for use in preparing the vinyl polymer can be styrene or other aromatic monomer or a conjugated diene or mixtures thereof. In the instance that the hot melt adhesive composition is prepared with an ethylene-vinyl acetate base polymer, an ethylene or other olefin, a vinyl acetate or other vinyl ester monomer or an ethylene-vinyl acetate mixture with the carboxylic acid containing monomer can be made. Suitable examples of such vinyl monomers for use in preparing the carboxyl containing polymer include ethylene, propylene, styrene, vinyl chloride, 1,4-butadiene, hydroxyalkyl-acrylate and methacrylate, N-vinyl heterocyclic monomers such as N-vinyl pyrrolidone, N-vinyl pyrridine, and N-vinyl epsilon-caprolactam; acrylamide, methacrylamide, and N-(1,1-dimethyl-3-oxobutyl) acrylamide; the linear or branched $C_{1-10}$ alkyl esters of acrylic acid or methacrylic acid including methylacrylate, ethylacrylate, butylacrylate, 2-ethylhexylacrylate, methyl methacrylate, ethylmethacrylate, 2-ethoxyethylmethacrylate, cyclohexylmethacrylate, and vinyl esters of carboxylic acids including vinyl acetate, vinyl propionate, and other vinyl monomers well known in the art.

Preferred polymers for use in making the adhesive additive composition of the invention comprise carboxylated vinyl polymers such as a carboxylated styrene butadiene block copolymer or vinyl polymers containing acrylic acid or methacrylic acid, having a molecular weight of about 10,000 to 100,000, a melt index from about 3 to 600, and an acid number from about 0.2 to 20. The most preferred polymers comprise ethylene-vinyl acetate-acrylic or methacrylic acid terpolymers which contain from about 5 to 95 mole-% ethylene, 5 to 95 mole-% vinyl acetate, and up to about 5 mole-% of acrylic or methacrylic acid and about 1 to 5 carboxyl groups per polymer chain. These carboxyl-containing polymers are available from the duPont de Nemours Company, Wilmington, Del.

The polyfunctional epoxy compounds useful in manufacturing the adhesive additive compositions of this invention are typically known as epoxy resins. Epoxy resins are most commonly made by reacting a glycidyl compound with another reactive compound resulting in a polyfunctional epoxy compound. Epoxy Novolak resins useful in the invention can have the following general formula:

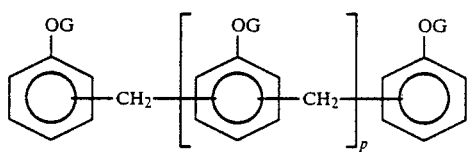

wherein p is about 0 to 20 and G is

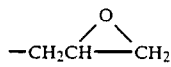

a glycidyl residue. Another useful epoxy resin has the formulae:

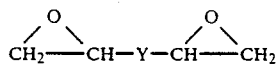

wherein Y is a group resulting from the reaction product of a epihalohydrin such as epichlorohydrin and a polyhydric phenol. Typical polyhydric phenols include such compounds as resorcinol and various bis-phenols resulting from the condensation of phenol with aldehydes and ketones in a well known class of condensation reactions. Representative of commercially available compositions include the Novolak compositions and glycidyl adducts of bisphenols such as 2,2'-bis(p-hydroxyphenyl)propane; 4,4'-dihydroxydiphenylsulfone; 4,4'-dihydroxybiphenyl; 4,4'-dihydroxydiphenylmethane; 2,2'-dihydroxydiphenyloxide, etc.

The preferred epoxy resins of the invention comprise a glycidyl adduct of a condensation product of formaldehyde and phenol; a glycidyl adduct of a bisphenol compound; a diglycidyl ether of a bisphenol-unsaturated fatty acid dimer reaction product; or a glycidyl adduct of an unsaturated fatty acid dimer. Such resins are well known and are commercially available EPON trademark from Shell Chemical Co.

Compounds having one epoxy reactive hydrogen can be used in combination with the carboxyl-containing polymer and the polyfunctional epoxy compound to form the polymeric adhesive additive compositions of the invention. Active hydrogen atoms are typically found on groups such as amines including secondary amino groups; carboxyl groups; phenolic hydroxyl groups; and mercaptan (—SH, sulfhydryl) groups. Monofunctional epoxy reactive active hydrogen containing compounds include monoacids, monophenols, monomercaptans and monoamines. Monoacids include acetic acid, butyric acid, heptanoic acid, palmitic acid, olearic acid, benzoic acid, oleic acid, abietic acid, etc. Monophenols include phenol, nonylphenol, p-tertbutyl-phenol, etc. Monomercaptans include laurylmercaptan, dodecylmercaptan, etc. Monoamines are preferably secondary monoamines which include dimethylamine, laurylmethylamine, dibutylamine, benzylethylamine, etc.

We have found in the preparation of the adhesive additive compositions of the invention that the polyfunctional epoxy compound tends to react with the carboxyl groups in the carboxyl-containing polymer. Such reaction tends to produce beta hydroxy linkages and a side chain with a terminal epoxy group which further react with carboxyl or other epoxy reactive groups. By varing the type and amounts of epoxy and epoxy reactive groups, a polymeric adhesive additive composition with varied properties can be produced.

In some cases monofunctional epoxy reactive active hydrogen containing compounds preferably contain hydroxy functionality, and can contain about 1 to 4 hydroxy groups per molecule. Typical hydroxyl containing amines include monoalkanol amines, dialkanol amines, hydroxy substituted piperidine, hydroxy substituted cyclohexyl amine, and others. Preferred hydroxyl containing amines include the mono and di $C_{2-5}$-alkanol amines. The most preferred hydroxyl containing amines comprise the monoethanol amine and diethanol amine.

Hydroxyl containing mercapto or sulfhydryl compounds can include virtually any organic compound having both a hydroxyl group and a sulfhydryl group. The mercapto group is typically reacted with the epoxy group and the polymeric additive composition. Examples of hydroxyl containing mercapto compounds include 2-mercaptoethanol, 3,3-mercapto-1,2-hydroxy propane, 4-mercaptocyclohexanol, 2-hydroxyl-1,3-propanethiol, and others.

Hydroxy substituted carboxylic acid compounds can be used as a hydroxyl compound having a reactive hydrogen group. Examples of hydroxy substituted carboxylic acids include lactic acid, trimethylol propionic acid, 2-hydroxy succinic acid, 4-hydroxy benzoic acid, 5-hydroxy valeric acid, 12-hydroxy stearic acid, 4-hydroxy phenylacetic acid, and others.

Polyfunctional hydroxy aromatic compounds can be used as hydroxyl compounds with a reactive hydrogen atom in preparing the polymeric adhesive additive compositions of the invention. Typically the polyfunctional hydroxy aromatic compound contains 2 or more hydroxy compounds substituted on an aromatic nucleus. Typical examples of such compounds include catechol, resorcinol, hydroquinone, 2,6-hydroxy-naphthalene, and others.

Optionally, the novel adhesive additive composition of the invention can include other components which affect the properties of the additive. One preferred optional component comprises a dimer acid composition. We have found that the inclusion of dimer acid compositions in the reaction product improves the mechanical characteristics of adhesives containing the composition. Dimer acid compositions are well known products comprising the reaction product of at least two $C_{12}$-$C_{24}$ unsaturated fatty carboxylic acid compounds. Dimer acids are typically formed through the reaction of at least one unsaturated site on each carboxylic acid molecule which join the molecules into a dimer acid. Such dimer acids are well known in the art and sold under the EMPOL trademark. Other diacids, diphenols, diamines preferably secondary, dimercaptans and mono-amines can be used as reactants in the preparation of the epoxy adduct of the invention.

Catalysts may preferably be added to the reaction mixture to shorten the reaction time and to control the reaction products. Catalysts that can be used are known to those skilled in the art. See for example "Handbook of Epoxy Resins" by Lee and Neville, 1967, McGraw-Hill, Inc. Catalysts include tertiary amines (like tributylamine, benzyldimethylamine), quaternary phosphonium salts, tertiaryphosphines (like triphenylphosphine), acid salts (like potassium acetate, lithiumbenzoate, lithiumnaphthenate, sodium acetate).

Since the novel adhesive additive composition of this invention is primarily directed for hot melt formulation, the additive composition is typically prepared in the absence of solvents. However, solvents can be used but their use typically requires a post-reaction stripping step to remove substantially all solvent traces. Typically the composition is prepared in any adequate industrial reaction vessel. Preferred reaction vessels include standard heated industrial mixers which can effectively contact the viscous reactants under reaction promoting conditions. Typically the reaction can be run at sufficiently high temperature to reduce the viscosity of the reactants and to promote the reaction between the components. Such effective reaction temperature is about 100° to 400° F., preferably 125° to 375° F., and most preferably 150°-350° F. for reasons of reaction speed, low viscosity, and convenience. Typically, the reactants complete the reaction in a period of from about 1 to 5 hours, most typically from about 1 to 3 hours.

Typically, the components are reacted at mole ratios which provide the properties desired in the product. The amount of epoxy and epoxy reactive hydrogen compound can be varied in order to increase or decrease the hydrophilicity of the polymer or the compatibility of the additive with water soluble or water actuated components. Other components of the reaction product can be varied with compatibility properties in mind. Typically the reaction product is made by combining sufficient quantity of the carboxyl-containing polymer and about 1 to 50 mole-% of the epoxy resin, and from about 0.1 to about 50 mole-% of the monofunctional such as hydroxy compound. Optionally the composition can also contain about 1 to 15 mole-% of a dimer acid composition.

Within the broad reaction parameters described above, specific adduct compositions can be made using proportions of reactants that control molecular weight and prevent crosslinking or gel formation.

Molecular weight control and prevention of gelling is typically controlled by the inclusion of sufficient monofunctional reactant in the reaction mixture to reduce crosslinking which is typically caused by the reaction of di-, tri- or other higher polyfunctional compounds. Polymeric reactants can be considered monofunctional if the polymer chain contains on the average less than 2 pendent functional groups. Gellation is typically reduced since monofunctional compounds can end both polymeric chain growth and crosslinking in the typical reaction mixture. More particularly, if a polymer with two or more epoxy reactive groups per polymer molecule is included in the formulation in the reaction mixture can include a high percentage of monofunctional epoxy or other active hydrogen compounds. Molecular weight control can also be obtained using molar excesses of a reactant such as a molar excess of acid functionality, amine functionality, etc. Typically excesses of epoxy is not preferred since diepoxy compounds can under certain conditions of heat and storage time, result in epoxy-epoxy crosslinking. Gelling tendencies and theoretical molecular weight calculations can be made using the estimation methods found in Flory, *Principles of Polymer Chemistry*, Cornell University Press (1953), pp. 317-398.

In preparing epoxy adduct compositions which can be added to conventional hot melt adhesive compositions to form stable adhesive compositions which do not separate into phases, we have discovered two techniques. First, the epoxy adduct can be made by combining the components to produce an adduct having a polarity which is reflected in the average dipole moment on the epoxy adduct compound, similar to that of the thermoplastic polymer of the adhesive. It is well known that compounds of similar polarity are typically compatible. It is well within the skill of the art to control the reaction ratios of the components such as epoxy compounds, dimer acid compounds, monofunctional active hydrogen containing compounds and others to form adducts of the appropriate polarity. One preferred embodiment of the invention comprises hot melt adhesives made from polyalkyleneoxazoline polymers. Typically such polymers are compatible in hot melt compositions with epoxy adducts having a sufficient number of beta hydroxy groups formed in the epoxy reaction. Secondly, in the instance that the epoxy adduct comprises the reaction product of a polymer having an epoxy reactive hydrogen group, the base polymer can be selected from polymers in the same general chemical class as the base thermoplastic polymer. Accordingly, if the base thermoplastic polymer comprises an ethylene vinyl acetate copolymer, the adduct can be made from an ethylene vinyl acetate polymer. Similarly, if the thermoplastic base polymer is a styrene butadiene styrene polymer, the adduct can be made from a styrene containing copolymer.

HOT MELT ADHESIVE COMPOSITIONS

The novel adhesive additive composition of the invention can be used in hot melt adhesive formulations at an effective amount to increase the adhesivity, compatibility, or other beneficial property of the adhesive composition.

The hot melt adhesives of the invention can also contain plasticizers, inorganic extenders, organic extenders, oils, UV absorbers, heat stabilizers, flavorings, release agents, waxes, antiblocking agents, and antioxidants.

The base thermoplastic polymers useful in the hot melt adhesives are described above.

Typically thermoplastic base polymers have insufficient pressure sensitive properties for use as a pressure sensitive adhesive, tackifying agents are typically added to base polymer compositions in order to introduce tack into the composition. Tackifying agents are believed to increase the ability of the adhesive composition to "wet" the substrate surface. Many tackifying agents are well known in the art. Such agents include resins or resin blends, rosin, rosin acids, hydrogenated resins, tall oil pitchheads, hydrocarbon resins, terpene resins, and others. Examples of preferred tackifying agents include the ESCOREZ family of resins, the PERMALYN family of resins, the SYLVATAC family of resins, the NIREZ family of resins, and the WINGTACK family of resins.

Plasticizers can also be used in improving the quality of the hot melt adhesive compositions. Plasticizers are generally classified as materials which can be incorporated into another material to increase its workability, flexibility, or distensibility. The addition of the plasticizer can lower melt viscosity, the temperature of the second order transition point, or the elastic modulus of the treated material. Many plasticizers are known in the art and a plasticizer can be selected for inclusion in the hot melt adhesives of this invention which are compatible with the thermoplastic base polymer. Commonly employed plasticizers include compounds of the following classes: adipic acid derivatives, azolaic acid derivatives, benzoic acid derivatives, diphenyl derivatives, citric acid derivatives, epoxides, glycolates, isophthalic acid derivatives, maleic acid derivatives, plasticizer oils. phosphorous acid derivatives, phthalic acid derivatives, polyesters, trimelitates, polyols. Preferred plasticizers include the BENZOFLEX family of plasticizers, the SANTICIZER family of plasticizers, and the liquid polyalkylene glycols having molecular weights from about 200 to 10,000.

Waxes may also be combined with the base polymer, the epoxy adduct and other adhesive additives in the hot melt adhesives of this invention. Natural, synthetic and petroleum waxes are useful in the invention. Natural waxes include beeswax, and hydroxy containing waxes such as hydrogenated castor oil, reduced fatty acids, and other typically $C_{12}-C_{35}$ aliphatic hydroxy containing compositions. Synthetic waxes include typically low molecular weight polyethylene and Fisher-tropsch waxes, paraffin waxes, and microcrystalline waxes which can be derived from the refinement of petroleum residuum. Typically waxes have melting points in the range of about 125°-250° F. Such waxes can be used in the hot melt adhesive compositions of this invention at concentrations of from 0 to 30 wt-% depending on the properties desired.

The hot melt adhesives of this invention can be formulated using from about 10 to 55 wt-% of the thermoplastic base polymer, about 1 to 60 wt-% of a tackifying agent, and about 1 to 60 wt-% of the novel epoxy adduct adhesive additive composition of the invention. The hot melt adhesives can further contain an effective amount of a plasticizer, amounts of filler that do not degrade the adhesive properties of the hot melt adhesives of the invention but reduce cost, and other well known additive compositions.

The preferred adhesive additive compositions of the invention can contain 10 to 45 wt-% of a base polymer comprising an ethylene-vinyl acetate polymer, a polyethyloxazoline polymer, or an ABA block polymer having styrene-conjugated diene-styrene block structure, 15 to 55 wt-% of a compatible tackifying agent, 10 to 30 wt-% of the novel epoxy adduct adhesive additive composition of this invention, 0 to 30 wt-% wax, 0 to 35 wt-% of a plasticizer, and in the instance that a polyethyloxazoline polymer is used, 10 to 30 wt-% of an additional hydroxy organic compound.

The ethylene vinyl acetate thermoplastic polymers useful in making the hot melt adhesives of the invention preferably have a molecular weight in the range of 2,000 to 100,000, preferably 10,000 to 70,000, a melt index of 1 to 800, a percentage of vinyl acetate that ranges from about 18 to 50, most preferably about 28 to 46, and typically a softening point in excess of about 75° C.

The polyethyleneoxazoline thermoplastic base polymer for use in making the hot melt adhesive of the invention comprise a polymer having a molecular weight of about 50 to 500,000. Most preferably, the polymers have molecular weights of about 50–100,000, about 150,000–250,000, and about 300,000–350,000.

The hot melt additive composition of the invention can be blended in standard hot melt processing units using standard techniques.

The following Examples provide a basis for understanding the invention through a set of specific embodiments of the invention and include a best mode.

EXAMPLE I

Into a standard industrial mixer equipped with an inert gas blanket and heater was added 83.44 parts of an ethylene-vinyl acetate-methacrylic acid terpolymer (25 wt-% vinyl acetate, acid number-6, melt index 500, ELVAX 4310, duPont Chemical Co.). The polymer was heated under an inert gas blanket to a temperature of 350° F. until melted. Into the melt polymer was added 15.62 parts of an epoxy resin comprising a bisphenol A-epichlorohydrin reaction product (EPON 1004, Shell Chemical Co.). The epoxy resin was blended into the melt polymer until homogeneous, and about 0.94 parts of diethanolamine was added to the melt mixture at high mixing rates. The melt mixture was maintained at 350° F. for 2 hours. The appearance of the product was a light tan opaque thermoplastic solid.

EXAMPLE II

Into a standard industrial mixer equipped with an inert gas blanket and heater was added 79.7 parts of an ethylene-vinyl acetate-methacrylic acid terpolymer a vinyl acetate content of about 25%, a melt index of about 170, an acid number about 4-8, and a softening point of about 195° F. (91° C.) (ELVAX 4320, duPont Chemical Co.). The mixture was heated to 300° F. to melt the polymer. Into the polymer melt was added a $C_{36}$ (Ave.) aliphatic dibasic dimer acid made from $C_{18}$ (Ave.) unsaturated fatty acids (EMPOL 1014 dimer acid) having an acid value of about 196, a suponification value of 198, and an approximate molecular weight of about 565. The mixture was agitated until homogeneous and into the homogeneous melt was added 9.6 parts of an epoxy resin comprising a liquid bisphenol A-epichlorohydrin (EPON 828, Shell Chemical Co.). The mixture was blended until homogeneous and into the blend was added 0.89 parts of diethanolamine. The mixture was agitated until homogeneous, heated to 350° F., and stirred at high mixing speed for 1 hour. The reaction product was a light tan opaque thermoplastic mass.

EXAMPLE III

Into a standard industrial mixer equipped with an inert gas blanket and a heater, was added 79.7 parts of an ethylene vinyl acetate-methacrylic acid terpolymer (about 25 wt-% vinyl acetate, an acid number of about 6, and a melt index of about 500, ELVAX 4310, duPont Chemical Co.). The mixer was operated until the polymer was melted and into the melt was added 9.8 parts of a dimer acid made from a $C_{18}$ (Ave.) unsaturated fatty acid (EMPOL 1014, Emery). The mixer was operated until a mixture was homogeneous and into the melt was added 9.6 parts of an epoxy resin comprising a liquid bisphenol A-epichlorohydrin adduct (EPON 828, Shell Chemical Co.). The mixer was operated until the mixture was homogeneous and into the melt mixture was added 0.9 parts of diethanolamine. The homogeneous mixture was heated to 350° F. for 1 hour. At the end of that period the mixture was removed.

EXAMPLE IV

Into a standard industrial mixer equipped with an inert gas blanket and a heater was added 68.63 parts of an ethylene-vinyl acetate-acrylic acid terpolymer (25 wt-% vinyl acetate, acid number-6, melt index 500, ELVAX 4310, duPont Chemical Co.). The polymer was heated under the inert gas blanket to a temperature of 350° F. until melted. Into the melt polymer was added a $C_{36}$ (ave.) aliphatic dibasic dimer acid made from a $C_{18}$ (ave.) unsaturated fatty acid (EMPOL 1014 dimer acid) having an acid value of about 196, a saponification value of 198, and an approximate molecular weight of 565. The mixture was agitated until homogeneous and into the homogeneous melt was added 13.8 parts of an epoxy resin comprising a diglycidyl ether of bisphenol A (EPON 828, Shell Chemical Co.). The mixture was blended until homogeneous and into the blend was added 0.77 parts of diethanolamine. The mixture was agitated until homogeneous, heated to 350° F., and stirred at high mixing speed for 1 hour. The reaction product was a light tan opaque thermoplastic mass.

EXAMPLE V

Example IV was repeated except that 77.9 parts of ELVAX 4310, 11.9 parts of EMPOL 1014, and 7.83 parts of EPON 828 were used in addition to 2.08 parts of CARDURAE, a $C_{12-14}$ tertiary carboxylic acid-epichlorohydrin adduct and 0.25 parts of a benzyldimethylamine catalyst.

EXAMPLE VI

Example V was repeated except that 79.4 parts of ELVAX 4310, 9.71 parts of EMPOL 1014, and 9.57 parts of EPON 828 were used. The CARDURAE was omitted and 1.10 parts of heptanoic acid was substituted.

EXAMPLES VII-XXVIII

The following ethylene-vinyl acetate based hot melt adhesives were prepared using the proportions shown in the following Tables. Typically the hot melt adhesives were formulated in standard hot melt blending equipment with standard techniques. The Tables are shown in parts by weight. The adhesive properties of the adhesives are also shown in the Table. Such properties include viscosity at 250°, 300°, 350°, and 400° F. The 100 gram peel and 500 gram shear test shows the temperature at which the adhesive bond fails when subjected to the test method. The adhesive was used to bond to fluorocarbon coated board bonded at 350° F. conditioned for 24 hours and tested for its adhesive properties at substantially reduced temperature.

| Example VII-XII | | | | | | |
|---|---|---|---|---|---|---|
| | Parts by Weight | | | | | |
| | VII | VIII | IX | X | XI | XII |
| Permalyn 105 | 50 | 50 | 50 | 50 | 45 | 45 |
| Benzoflex 50 | | | | 2 | | |
| Unilin 405 | | | 10 | | | |
| Unilin 550 | 10 | | | | 15 | 20 |
| Ex. III | 20 | | 20 | 20 | | |
| Ex. IV | | 20 | | | 20 | |
| Ex. V | | | | | | |
| Ex. VI | | | | | | |
| EVA** 28% VA 400 MI*** | | | | | | 35 |
| EVA** 33% VA 43 MI | | 30 | | | | |
| EVA** 46% VA 90 MI | 20 | | 20 | 20 | 20 | |
| EVA** 28% VA 800 MI | | | | 8 | | |
| EVA** Elvax 4310 | | | | | | |
| Viscosity (cps) at | | | | | | |
| 250° F. | 34,000 | | | 68,000 | 36,500 | 4,400 |
| 300° F. | 8,200 | 64,000 | | 20,750 | 9,360 | 1,675 |
| 350° F. | 3,060 | 21,000 | | 7,360 | | 763 |
| 400° F. | 1,275 | 8,200 | | 3,150 | | 400 |
| 100 g. peel | 130° F. | 134° F. | 124° F. | 114° F. | 130° F. | 133° F. |
| 500 g. shear | 160° F. | 148° F. | 155° F. | 126° F. | 159° F. | 187° F. |
| Fluorocarbon coated board; bonded at 350° F.; conditioned for 24 hours | | | | | | |
| 0° F. | 100% ft* | 100% ft | 100% ft | 100% ft | 100% ft | no ft |
| −20° F. | 100% ft | 100% ft | 100% ft | 100% ft | 100% ft | |
| −25° F. | 100% ft | 100% ft | | | 100% ft | |

| Examples XIII-XVIII | | | | | | |
|---|---|---|---|---|---|---|
| | Parts by Weight | | | | | |
| | XIII | XIV | XV | XVI | XVII | XVIII |
| Permalyn 105 | 50 | 50 | 50 | 50 | 50 | 50 |
| Benzoflex 50 | | | | | | |
| Unilin 405 | | | | | | |
| Unilin 550 | | | 10 | 10 | 10 | 10 |
| Ex. III | | | | | | |
| Ex. IV | 20 | 20 | | | | |
| Ex. V | | | 20 | | | |
| Ex. VI | | | | 20 | | |
| EVA** 28% VA 400 MI*** | | | | | | |

-continued

|  |  |  |  |  |  |  |
|---|---|---|---|---|---|---|
| EVA** 33% VA 43 MI |  | 30 |  |  |  |  |
| EVA** 46% VA 90 MI | 30 |  |  | 40 | 20 |  |
| EVA** 28% VA 800 MI |  |  |  |  |  |  |
| EVA** Elvax 4310 |  |  |  |  | 20 |  |
| Viscosity (cps) at |  |  |  |  |  |  |
| 250° F. |  |  | 29,800 | 25,600 |  |  |
| 300° F. | 55,000 |  | 7,200 | 7,560 |  |  |
| 350° F. | 18,750 |  | 2,700 | 2,900 | 5,120 | 2,460 |
| 400° F. | 7,800 |  | 1,138 | 1,213 |  |  |
| 100 g. peel | 116° F. | 132° F. | 131° F. | 130° F. | 132° F. | 128° F. |
| 500 g. shear | 127° F. | 144° F. | 163° F. | 168° F. | 167° F. | 164° F. |
| Fluorocarbon coated board; bonded at 350° F.; conditioned for 24 hours |  |  |  |  |  |  |
| 0° F. | 100% ft | 100% ft | 100% ft* | 100% ft | 0% ft | 0% ft |
| −20° F. | 100% ft |  | 100% ft | 100% ft | 15% ft | 0% ft |
| −25° F. | 100% ft | 20% ft |  |  |  |  |

*ft = fiber tearing bonds
**EVA = ethylene vinyl acetate copolymer
***MI = melt index

| Examples XIX-XXII | | | | |
|---|---|---|---|---|
|  | Parts by Weight | | | |
|  | XIX | XX | XXI | XXII |
| Zonester 100 | 40 |  |  |  |
| Polar Rosin Ester |  | 50 |  |  |
| Nirez 111-105 |  |  | 50 |  |
| Sylvatac 295 |  |  |  | 50 |
| Unilin 550 | 20 |  | 10 | 10 |
| Ex. III |  |  | 20 | 20 |
| Ex. IV |  | 20 |  |  |
| EVA** 18% VA 500 MI*** | 20 |  |  |  |
| EVA** 28% VA 400 MI | 20 |  |  |  |
| EVA** 33% Va 43 MI |  | 30 |  |  |
| EVA** 46% VA 90 MI |  |  | 20 | 20 |

-continued

| Examples XIX-XXII | | | | |
|---|---|---|---|---|
|  | Parts by Weight | | | |
|  | XIX | XX | XXI | XXII |
| Viscosity (cps) at |  |  |  |  |
| 250° F. | 5,900 |  |  |  |
| 300° F. | 2,325 |  |  |  |
| 350° F. | 1,063 |  |  |  |
| 400° F. | — |  |  |  |
| 100 g. peel | 130° F. |  | 134° F. | 129° F. |
| 500 g. shear | 189° F. |  | 163° F. | 158° F. |
| Fluorocarbon coated board; bonded at 350° F.; conditioned for 24 hours |  |  |  |  |
| −20° F. |  |  | 90% ft | 75% ft |
| −25° F. | no ft | 100% ft |  |  |

*ft = fiber tearing bonds
**EVA = ethylene vinyl acetate copolymer
***MI = melt index

| Examples XXIII-II | | | | | | |
|---|---|---|---|---|---|---|
|  | Parts by Weight | | | | | |
|  | XXIII | XXIV | XXV | XXVI | XXVII | XXVIII |
| Sylvatac 105 | 50 | 50 |  |  |  |  |
| Escorez 2393 |  |  | 50 | 50 | 50 | 70 |
| Unilin 550 | 10 |  |  |  |  |  |
| Unilin 700 |  | 10 |  |  |  |  |
| Ex. I |  |  |  |  |  | 20 |
| Ex. I |  |  | 20 |  |  |  |
| Ex. III | 20 |  |  | 20 |  |  |
| Ex. IV |  | 20 |  |  | 20 |  |
| EVA** 28% VA 800 MI*** |  |  |  |  |  | 10 |
| EVA** 33% VA 43 MI |  |  |  | 30 | 30 |  |
| EVA** 40% VA 57 MI |  |  | 30 |  |  |  |
| EVA** 46% VA 90 MI | 20 | 20 |  |  |  |  |
| Viscosity (cps) at |  |  |  |  |  |  |
| 250° F. | 32,750 | 52,000 |  | 150,000 |  |  |
| 300° F. | 12,750 | 16,500 |  | 41,000 | 49,500 |  |
| 350° F. | 3,500 | 4,700 |  | 15,500 | 19,500 |  |
| 400° F. | 1,550 | 2,150 |  | 7,200 | 8,500 |  |
| 100 g. peel | 129° F. |  | 127° F. | 135° F. | 131° F. |  |
| 500 g. shear | 160° F. |  | 130° F. | 147° F. | 146° F. |  |
| Fluorocarbon coated board; bonded at 350° F.; conditioned for 24 hours |  |  |  |  |  |  |
| 0° F. | 100% ft | 100% ft | 100% ft | 100% ft | 100% ft |  |
| −20° F. | 85% ft | 100% ft |  |  |  |  |

-continued

| | Examples XXIII-II | | | | | |
|---|---|---|---|---|---|---|
| | Parts by Weight | | | | | |
| | XXIII | XXIV | XXV | XXVI | XXVII | XXVIII |
| −25° F. | | | 25% ft | 100% ft | 100% ft | no ft |

*ft = fiber tearing bonds
**EVA = ethylene vinyl acetate copolymer
***MI = melt index The Examples and data clearly show that the adduct of the invention and the hot melt adhesives containing the adduct of the invention substantially improves bonding of the adhesives to fluorocarbon coated board. Fluorocarbon coated materials are notoriously difficult bonding media. The 100% fiber tear bonds provided by the ethylene-vinyl acetate based adhesives of this invention are unusually good.

EXAMPLE XXIX

Into a glass jar was added 30 parts of the product of Example I. The contents of the jar were hand mixed and 30 parts of the polyethyloxazoline polymer having a molecular weight of about 80,000 (PeOx, Dow Chemical Co.) were added. Into the blend was added 40 parts of a distilled tall oil rosin, ACTINOL (SPR-Arizona Chemical Co.). The blend was heated in a 350° F. oven and hand mixed until uniform, resulting in a uniform, single phase, medium brown cloudy thermoplastic solid. The composition was used as adhesive to bond paper on paper. The adhesive had an acceptable open time and was repulpable.

Using the procedure of Example XXII the following adhesives were prepared.

TABLE II

| | PeOx Hot Melt Adhesives | | | | |
|---|---|---|---|---|---|
| | XXIX-A | XXIX-B | XXIX-C | XXIX-D | XXIX-E |
| PeOx (low m.w.) | 30 | 30 | 30 | 30 | 30 |
| Actinol tall oil resin | 40 | 40 | 40 | 40 | 40 |
| Ex. III | 30 | | | | |
| Ex. V | | 30 | | | |
| Ex. VI | | | 30 | | |
| Ex. I | | | | 30 | |
| Elvax 4310 | | | | | 30 |

All the adhesives in Table II except for XVIIE, were uniform light brown thermoplastic masses that formed paper to paper fiber tearing bonds. The product of Example XVIIE would separate into phases upon standing at elevated hot melt temperatures. The adhesives were of acceptable viscosity and were repulpable in aqueous solution.

EXAMPLE XXX

Into a high shear mixer was placed 188.36 grams, 0.0013 equivalent of a carboxylated styrene-butadiene block copolymer having an equivalent weight of about 140,000, 15 wt-% styrene and an acid number of 0.4. The polymer was mixed and heated to 350° F. and into the hot mass was added 5.06 grams, 0.027 equivalents of a liquid bisphenol A-epichlorohydrin adduct (EPON 828) and 6.16 grams, 0.052 equivalents of a dimer acid (EMPOL 1014). Mixing was continued until the blend was uniform and into the blend was added 0.42 grams, 0.004 equivalent of diethanol amine. The mixture was reacted with stirring for 1 hour. The resulting product was a light tan thermoplastic mass.

EXAMPLE XXXI

Example III was repeated except that 37.29 parts of a dimer acid (EMPOL 1014), 49.02 parts of a liquid bisphenol-A-epichlorhydrin adduct (EPON 820) and 13.69 parts of diethanol amine were substituted for the reactants of Example III.

The above Examples, discussion and test data describe the invention. However, since many embodiments of the invention can be made without departing from the spirit and scope of the invention, the invention resides in the claims hereinafter appended.

We claim:

1. A hot melt adhesive composition suitable for providing improved adhesivity to hard-to-stick surface including fluorocarbon surfaces, which comprises:
   (a) an effective amount of a thermoplastic polymer to form a hot melt adhesive;
   (b) an effective tackifying amount of a tackifying resin; and
   (c) an effective bond improving amount of a hot melt adhesive additive composition comprising the reaction product of:
      (i) a compound having at least one free epoxy reactive hydrogen other than a dimer acid,
      (ii) an epoxy resin, and
      (iii) a dimer acid
   wherein the reference of the additive composition are used in proportion that prevent crosslinking or gel formation.

2. The composition of claim 1 wherein the thermoplastic polymer comprises an ethylene-vinyl acetate copolymer.

3. The adhesive composition of claim 1 wherein the thermoplastic polymer comprises a polyethyloxazoline polymer.

4. The composition of claim 3 wherein the hydroxy compound comprises a hydroxy containing amine compound.

5. The composition of claim 4 wherein the alkanol amine compound is an ethanol amine compound.

6. The composition of claim 5 wherein the alkanol amine compound comprises monoethanolamine.

7. The composition of claim 4 wherein the alkanol amine compound comprises monoethanolamine, diethanolamine, or mixtures thereof.

8. The composition of claim 5 wherein the ethanol amine compound comprises diethanol amine.

9. The composition of claim 1 wherein the epoxy compound comprises the glycidyl adduct of the condensation product of formaldehyde and phenol.

10. The composition of claim 9 wherein the epoxy compound comprises a glycidyl adduct of a bisphenol compound.

* * * * *